(12) United States Patent
Thaler et al.

(10) Patent No.: US 8,649,387 B2
(45) Date of Patent: Feb. 11, 2014

(54) METHOD AND SYSTEM FOR FIBRE CHANNEL AND ETHERNET INTERWORKING

(75) Inventors: Patricia Ann Thaler, Carmichael, CA (US); Uri Elzur, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 1135 days.

(21) Appl. No.: 12/414,332

(22) Filed: Mar. 30, 2009

(65) Prior Publication Data

US 2009/0245791 A1 Oct. 1, 2009

Related U.S. Application Data

(60) Provisional application No. 61/040,464, filed on Mar. 28, 2008.

(51) Int. Cl.
*H04L 12/28* (2006.01)

(52) U.S. Cl.
USPC .............................. 370/401; 370/255; 370/256

(58) Field of Classification Search
None
See application file for complete search history.

(56) References Cited

U.S. PATENT DOCUMENTS

| 6,609,165 | B1* | 8/2003 | Frazier | 710/36 |
| 7,944,812 | B2* | 5/2011 | Carlson et al. | 370/217 |
| 8,108,454 | B2* | 1/2012 | Snively et al. | 709/200 |
| 2009/0034522 | A1* | 2/2009 | Hayes et al. | 370/389 |

* cited by examiner

*Primary Examiner* — Marcus R Smith
*Assistant Examiner* — Mark A Mais
(74) *Attorney, Agent, or Firm* — Thomas|Horstemeyer, LLP.

(57) ABSTRACT

Certain aspects of a method and system for Fiber Channel and Ethernet interworking may include receiving by a central processing unit (CPU), one or more requests for discovery of one or more Fiber Channel (FC) switches based on a Fiber Channel initialization protocol (FIP). The CPU may be operable to facilitate, via a network switch, a proxy login into the one or more FC switches based on the FIP for one or more servers. The one or more servers may be operable to directly communicate and/or receive packets to/from the FC switches via the network switch. The network switch may be operable to determine a destination address of one or more servers based on the facilitated proxy login by the CPU if the one or more servers utilize fabric provided MAC addresses (FPMA) or utilize a MAC address table if the one or more servers utilize server provided MAC addresses (SPMA).

21 Claims, 6 Drawing Sheets

METHOD AND SYSTEM FOR FIBRE CHANNEL AND ETHERNET INTERWORKING

CROSS-REFERENCE TO RELATED APPLICATIONS/INCORPORATION BY REFERENCE

This application makes reference to, claims priority to, and claims benefit of U.S. Provisional Application Ser. No. 61/040,464, filed Mar. 28, 2008.

The above stated application is hereby incorporated herein by reference in its entirety.

FEDERALLY SPONSORED RESEARCH OR DEVELOPMENT

Not Applicable

MICROFICHE/COPYRIGHT REFERENCE

Not Applicable

FIELD OF THE INVENTION

Certain embodiments of the invention relate to communication networks. More specifically, certain embodiments of the invention relate to a method and system for Fibre Channel and Ethernet interworking.

BACKGROUND OF THE INVENTION

Innovations in data communications technology, fueled by bandwidth-intensive applications, have led to a ten-fold improvement in networking hardware throughput occurring about every four years. These network performance improvements, which have increased from 10 Megabits per second (Mbps) to 100 Mbps, and now to 1-Gigabit per second (Gbps) and 10-Gbps and higher, have outpaced the capability of central processing units (CPUs). To compensate for this dilemma and to free up CPU resources to handle general computing tasks, offloading Transmission Control Protocol/Internet Protocol (TCP/IP) functionality to dedicated network processing hardware is being utilized. TCP/IP chimney offload maximizes utilization of host CPU resources for application workloads, for example, on Gigabit and multi-Gigabit networks.

Converged network interface devices are generally utilized to integrate a plurality of different types of network traffic into one physical network. Although there may be instances when the quality of service (QoS) requirements for the different types of traffic are consistent, it is often the case that these QoS requirements are inconsistent with each other. Management traffic, for example, may require guaranteed delivery regardless of traffic conditions. Converged network interface devices may be utilized to perform protocol acceleration and protocol processing beyond OSI layer 2 and may require considerable computational power. Certain types of traffic such as clustering traffic may require low latency. Storage traffic, for example, may require efficient guaranteed delivery with varying bursty traffic loads. Some types of traffic such as critical networking traffic may require varying levels of prioritization, while other networking traffic may require best effort.

Clustering traffic may use proprietary or standardized clustering technologies. Storage traffic may use fibre channel, for example, while networking traffic may use Ethernet. In many cases, management traffic may utilize a separate out of band management network to guarantee delivery and avoid mixing it with the user Ethernet network. Each of these separate networks may be specifically designed to guarantee the quality of service required for the payload it carries so that there are no other traffic types with conflicting QoS requirements trying to share the same network. When consolidating all these networks over a single network that carries all traffic types, the converged network may provide similar QoS as guaranteed by the physically separate networks.

Computer networks comprise a plurality of interconnected networking devices, such as routers, switches and/or computers. The physical connection that allows one networking device to communicate with another networking device is referred to as a link. Links may utilize wired or wireless communication technologies. Data may be communicated between networking devices via the link in groups of binary bits referred to as packets. The rate at which networking devices may communicate data via a link is referred to as link speed.

Demands for increasing link speeds and computing speeds have driven a variety of specialized computer networking architectures. There are networking architectures, such as Ethernet, which are widely utilized for communications based on the Internet Protocol (IP). There are other networking architectures, such as Fibre Channel, which are widely utilized in storage area network (SAN) architectures. Still other networking architectures are utilized in cluster computing architectures. Networking devices, which communicate via one or more of the diverse computer networking architectures may comprise distinct input and output (I/O) interfaces for communicating with each of the one or more diverse computer networking architectures.

Fibre Channel over Ethernet (FCoE) is a technology that comprises a number of proposals, which may define a method for sending Fibre Channel traffic over Ethernet in order to enable a single networking technology that may be utilized for IP communications, SAN and cluster computing, for example. In one aspect, FCoE may define a method of data encapsulation, in which Fibre Channel (FC) frames may be encapsulated within an Ethernet frame. The FCoE may define an FCoE Forwarder (FCF), a device that may perform the functions of a Fibre Channel Switch in an Ethernet Network.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for Fibre Channel and Ethernet interworking which may be operable to connect FCoE traffic to a Fibre Channel network without the use of an FCF, substantially as shown in and/or described in connection with at least one of the figures, as set forth more completely in the claims.

These and other features and advantages of the present invention may be appreciated from a review of the following detailed description of the present invention, along with the accompanying figures in which like reference numerals refer to like parts throughout.

DETAILED DESCRIPTION OF THE INVENTION

Certain embodiments of the invention may be found in a system and/or method for Fibre Channel and Ethernet interworking. Exemplary aspects of the invention may comprise receiving by a central processing unit (CPU), one or more requests for discovery of one or more Fibre Channel switches based on a Fibre Channel initialization protocol (FIP). The CPU may be operable to facilitate, via a network switch, a proxy login into the one or more Fibre Channel switches based on the FIP for one or more servers. The one or more servers may be operable to communicate and/or receive packets to/from the Fibre Channel switches via the network switch. The network switch may be operable to determine a destination address of the one or more servers based on the facilitated proxy login by the CPU if the one or more servers utilize fabric provided MAC addresses (FPMA) or utilize a MAC address table if the one or more servers utilize server provided MAC addresses (SPMA).

Figure 1:
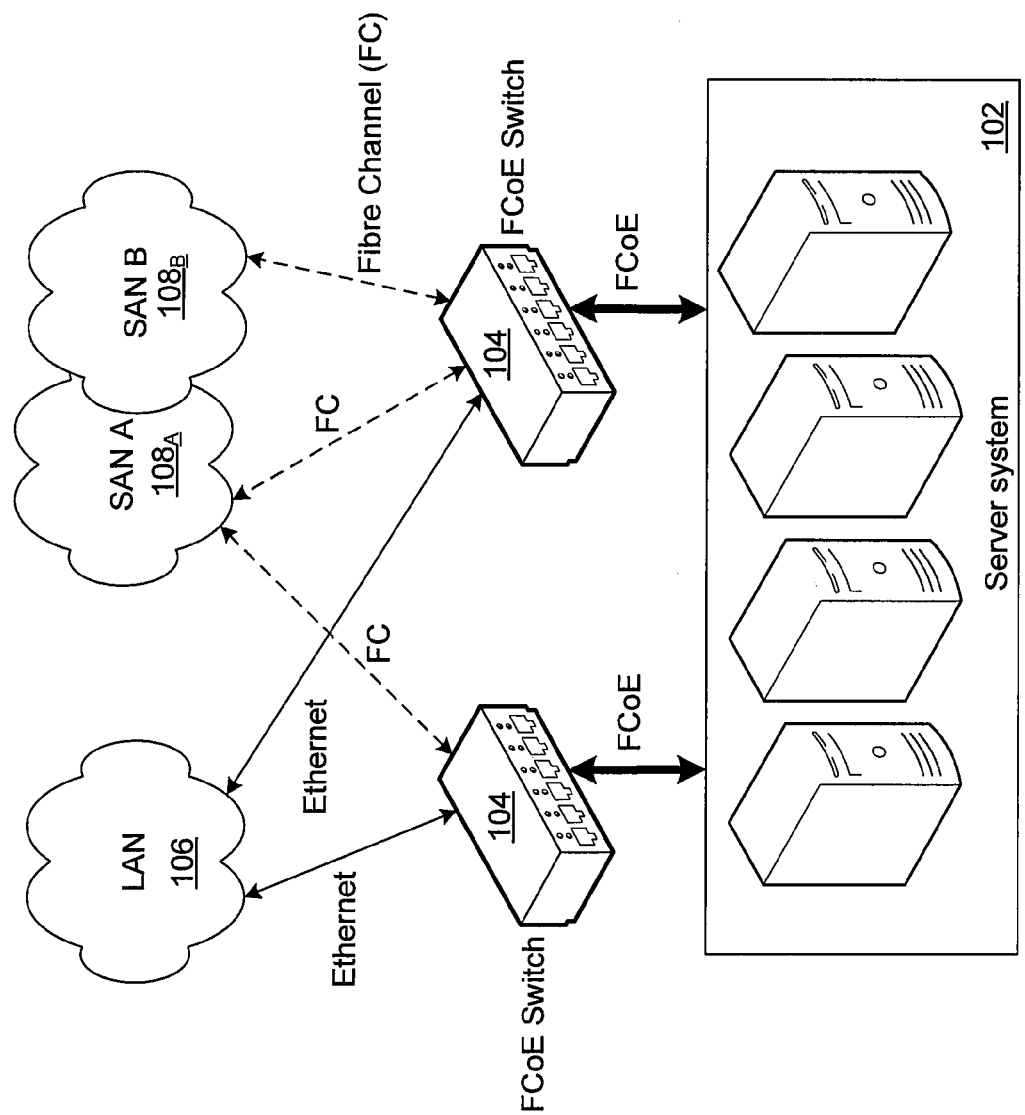
FIG. 1 is a block diagram of an exemplary system illustrating deployment of Fibre Channel over Ethernet (FCoE) switches.

FIG. 1 is a block diagram of an exemplary system illustrating deployment of Fibre Channel over Ethernet (FCoE) switches. Referring to FIG. 1, there is shown a server system 102, a plurality of FCoE switches 104, a local area network (LAN) 106 and a plurality of storage area networks (SANs), SAN A 108$_A$ and SAN B 108$_B$.

The server system 102 may comprise a plurality of blade servers, a plurality of network switches, a plurality of storage switches, a plurality of cluster blades, and a management blade, for example. The plurality of network switches may be operable to interconnect multiple computers together using a low-level communication protocol such as Ethernet. The server system 102 may comprise one or more FCoE host bus adapters (HBAs) that may be enabled to implement one or more FCoE host and/or array nodes (E nodes). The one or more E nodes may be operable to implement one or more FCoE virtual networking ports (VN_ports). The one or more VN_ports may be utilized to interconnect with the one or more FCoE switches 104.

The plurality of FCoE switches 104 may comprise suitable logic, interfaces, code, and/or one or more circuits that may be operable to inspect received data packets, determine the source and destination of the received packets, and forward the received packets accordingly. The plurality of FCoE switches 104 may comprise one or more FCoE ports, for example, VE_ports and/or VF_ports. The one or more VE_ports may be utilized to interconnect with the one or more E nodes in the server system 102. The one or more VF_ports may be utilized to interconnect with the one or more other FCoE switches 104.

The LAN 106 may comprise a plurality of computers and/or associated devices that may share a common communications line, wired and/or wireless link, for example, Ethernet. The connected devices may share the resources of a single processor or server within a small geographic area, for example.

The SANS, SAN A 108$_A$ and SAN B 108$_B$ may comprise a plurality of remote computer storage devices, such as disk arrays and/or tape libraries that may be attached to servers in such a way that the storage devices may appear as locally attached to an operating system. The SANs may utilize a Fibre Channel fabric topology, for example, that may provide faster and more reliable access.

In operation, the plurality of FCoE switches 104 may be operable to forward Fibre Channel packets from the server system 102 to the one or more SANS, SAN A 108$_A$ and SAN B 108$_B$ and/or forward Fibre Channel packets from the one or more SANS, SAN A 108$_A$ and SAN B 108$_B$ to the server system 102 based on encapsulation of the received Fibre Channel packets in FCoE packets. The plurality of FCoE switches 104 may be operable to forward Ethernet packets from the server system 102 to the LAN 106 and/or forward Ethernet packets from the LAN 106 to the server system 102.

Figure 2:
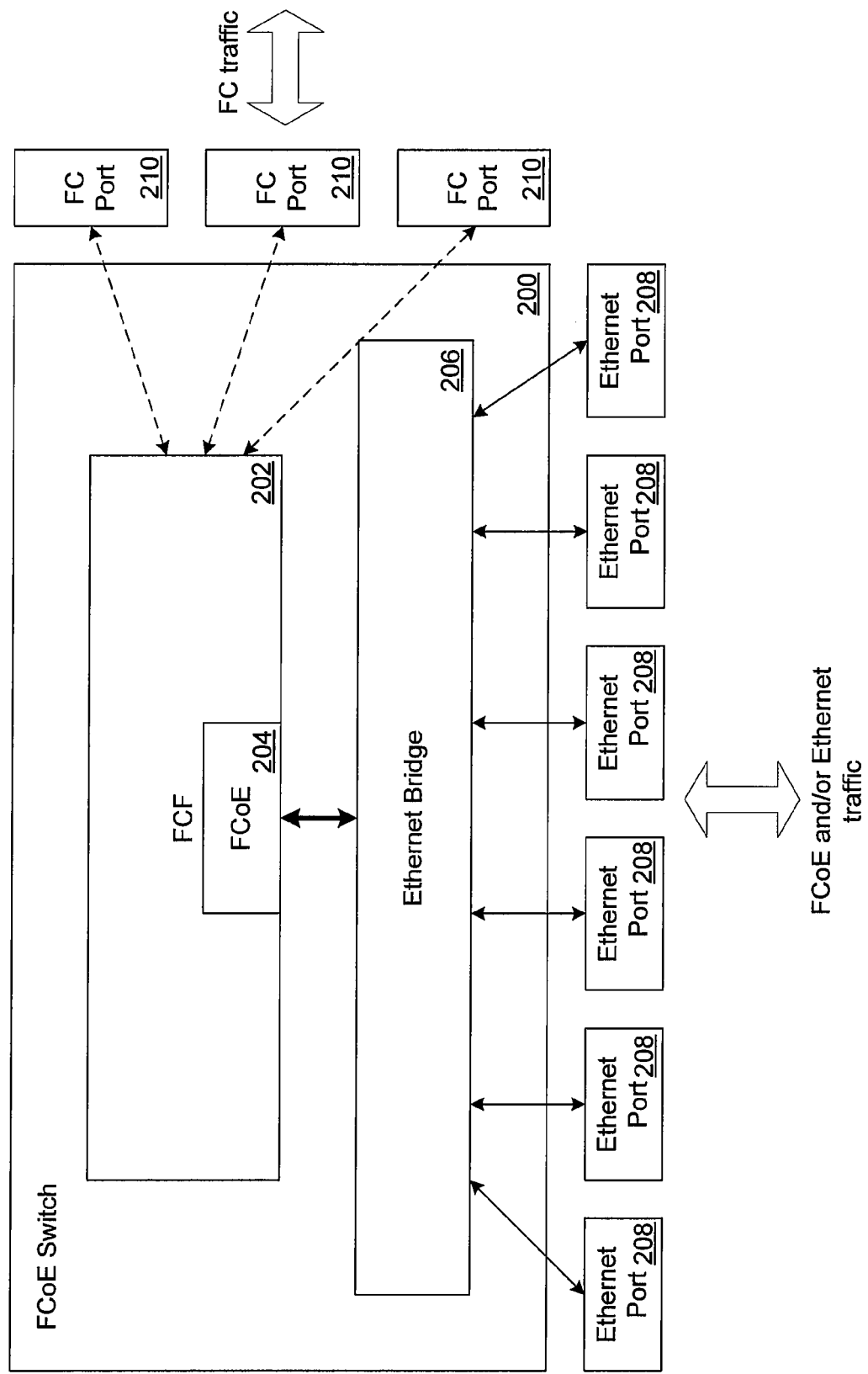
FIG. 2 is a block diagram of an exemplary FCoE switch.

FIG. 2 is a block diagram of an exemplary FCoE switch. Referring to FIG. 2, there is shown a FCoE switch 200, a plurality of Ethernet ports 208 and a plurality of Fibre Channel (FC) ports 210. The FCoE switch 200 may comprise a FCoE forwarder (FCF) 202 and an Ethernet bridge 206. The FCF 202 may comprise a FCoE entity 204.

The FCF 202 may comprise suitable logic, interfaces, code, and/or one or more circuits that may be operable to perform FC switching operations, for example. The FCF 202 may be operable to enable communication of data via the plurality of FC ports 210. Notwithstanding, the FCF may be referred to as a FC switch, without limiting the scope of the invention.

The FCoE entity 204 may comprise suitable logic, interfaces, code, and/or one or more circuits that may be operable to encapsulate FC packets into FCoE packets and/or decapsulate FCoE packets into FC packets, for example. The FCoE entity 204 may comprise an Ethernet medium access control (MAC) address that may be utilized as a source or destination address when FCoE packets are transmitted via Ethernet.

The Ethernet bridge 206 may comprise suitable logic, interfaces, code, and/or one or more circuits that may be operable to perform Ethernet switching operations, for example, switching between a plurality of clients and the server system 102. The Ethernet bridge 206 may be operable to enable communication of data via the plurality of Ethernet ports 208. The Ethernet bridge 206 may enable level 2 (L2) switching operations, for example.

In operation, one or more FC packets may be received by the FCF 202 via the one or more FC ports 210. The FCoE entity 204 may be operable to encapsulate the received FC packets into FCoE packets. The FCoE packets may be communicated to the Ethernet bridge 206. The Ethernet bridge 206 may be operable to communicate the FCoE packets to one or more servers, for example, server system 102 via the one or more Ethernet ports 208.

One or more FCoE packets may be received by the Ethernet bridge 206 from one or more servers, for example, server system 102. The Ethernet bridge 206 may be operable to communicate the received FCoE packets to FCF 202. The FCoE entity 204 may be operable to decapsulate the received FCoE packets into FC packets. The FCF 202 may be operable to communicate the FC packets to one or more other FC switches and/or SANs, for example, SAN A 108$_A$ and SAN B 108$_B$ via the one or more FC ports 210.

Figure 3:
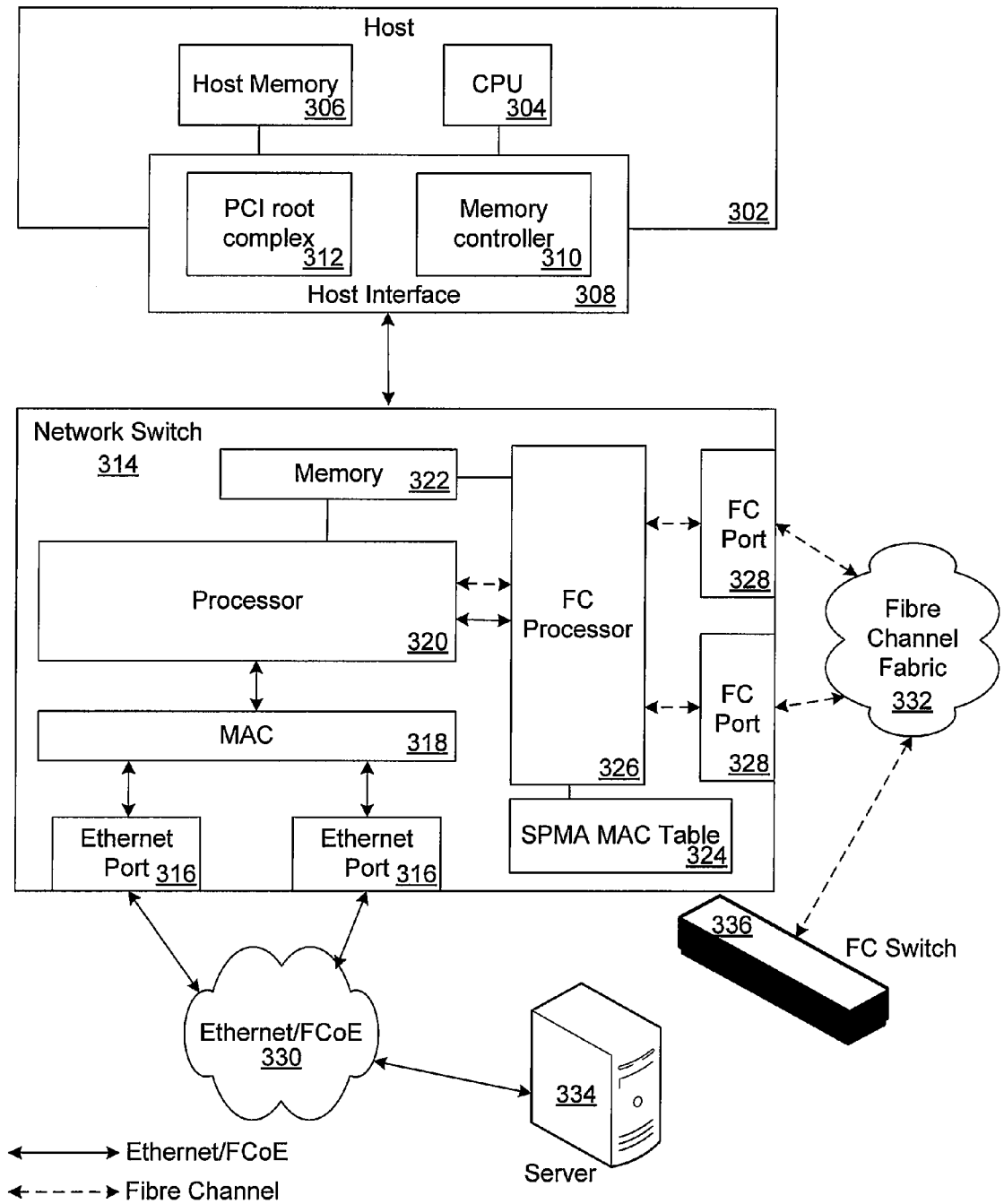
FIG. 3 is a block diagram of an exemplary system for Fibre Channel and Ethernet interworking, in accordance with an embodiment of the invention.

FIG. 3 is a block diagram of an exemplary system for Fibre Channel and Ethernet interworking, in accordance with an embodiment of the invention. Referring to FIG. 3, there is shown a host 302, a network switch 314, an Ethernet fabric 330, a FC fabric 332, a server 334 and a FC switch 336.

The host 302 may comprise a CPU 304, a host memory 306 and a host interface 308. The host interface 308 may comprise a memory controller 310 and a peripheral component interconnect (PCI) root complex 312.

The host interface 308 may be, for example, PCI, PCI-X, PCI-Express, ISA, SCSI or other type of bus. The host interface 308 may be coupled to PCI buses and/or devices, one or more processors, CPU 304 and memory, for example, host memory 306. Notwithstanding, the host memory 306 may be directly coupled to the network switch 314. The PCI root complex 312 may enable the host 302 to be coupled to PCI buses and/or devices, one or more processors, and memory, for example, host memory 306.

The memory controller 310 may be coupled to the CPU 304, to the host memory 306 and to the host interface 308. The memory controller 310 may comprise suitable logic, interfaces, code, and/or one or more circuits that may be operable to transfer data from a storage device or a LAN interface controller directly to random access memory (RAM), which speeds up processing of data.

The CPU 304 may comprise suitable logic, interfaces, code, and/or one or more processors that may be operable to receive a request for discovery of the FC switch 336 based on a Fibre Channel initialization protocol (FIP). The CPU 304 may be operable to receive and/or respond to the received request for discovery of the FC switch 336 based on the FIP. The CPU 304 may be operable to facilitate via the network switch 314, a login into the FC switch 336 based on the FIP. The CPU 304 may be operable to facilitate, via the network switch 314, a proxy login into the FC switch 336 based on the FIP for the server 334.

Although illustrated, for example, as a CPU 304 and an Ethernet fabric 330, the present invention need not be so limited to such examples and may employ, for example, any type of processor and any type of data link layer or physical media, respectively. The Ethernet fabric 330 may be operable to carry one or both of Ethernet packet traffic and/or FCoE packet traffic. In another embodiment of the invention, the CPU 304 may be enabled to handle a plurality of networking protocols and may be directly coupled to the Ethernet fabric 330. Furthermore, the present invention also contemplates different degrees of integration and separation between the components illustrated in FIG. 3.

The network switch 314 may be operable to perform Ethernet switching operations, for example, switching between a plurality of clients and the server 334. The network switch 314 may enable level 2 (L2) switching operations, for example. The network switch 314 may be coupled to the host 302 via the PCI root complex 312. The network switch 314 may comprise one or more Ethernet ports 316, a MAC 318, a processor 320, a memory 322, a server provided MAC addressing (SPMA) table 324, an FC processor 326, and a plurality of FC ports 328. For example, the processor 320 and the FC processor 326 may be a separate integrated chip embedded on a motherboard or may be embedded in a NIC.

The plurality of Ethernet ports 316 may be operable to receive and/or communicate packets via the Ethernet fabric 330. The plurality of Ethernet ports 316 may provide the hardware for sending and receiving data on a carrier, for example, cables. The MAC 318 may comprise suitable logic and/or one or more circuits that may be operable to control access to a medium that may be shared between a plurality of entities. The MAC 318 may comprise a MAC address that is unique to each network switch 314. The MAC 318 may be operable to encode and/or decode data packets into bits. The MAC 318 may be operable to furnish transmission protocol knowledge and/or management and may handle errors in the physical layer, flow control and frame synchronization. The MAC 318 may be operable to control how a computer on the network gains access to the data and permission to transmit it.

The processor 320 may comprise suitable logic, interfaces, and/or one or more circuits that may be operable to determine the connection identifier and/or a packet type for each packet. For example, the processor 320 may be operable to communicate one or more FIP packets to the CPU 304 based on the Ethertype of the received packets. The processor 320 may be operable to communicate one or more FCoE packets to the FC processor 320 based on the Ethertype of the received packets. The processor 320 may enable a converged fabric for networking, storage, and clustering.

The memory 322 may comprise suitable logic, interfaces, code, and/or one or more circuits that may be operable to employ a buffering scheme to store network, FCoE and/or Fibre Channel (FC) packets until they are communicated via the Ethernet ports 316 and/or FC ports 328. In accordance with an embodiment of the invention, one or more of the Ethernet ports 316 and/or FC ports 328 may have a memory to buffer incoming and/or outgoing packets. Notwithstanding, the invention may not be so limited and other memory buffers may be utilized without limiting the scope of the invention.

The server provided MAC addresses (SPMA) table 324 may comprise suitable logic and/or one or more circuits that may be operable to store a plurality of MAC addresses for each of a plurality of servers, for example server 334.

The FC processor 326 may comprise suitable logic, interfaces, code, and/or one or more circuits that may be operable to receive and/or communicate FC packets via the plurality of FC ports 328 from/to one or more FC switches, for example, FC switch 336 via the Fibre Channel fabric 332. The FC processor 326 may be operable to encapsulate FC packets into FCoE packets and/or decapsulate FCoE packets into FC packets, for example.

The FC switch 336 may comprise suitable logic, interfaces, code, and/or one or more circuits that may be operable to perform FC switching operations, for example. The FC switch 336 may be operable to enable communication and/or reception of data from/to the network switch 314 via the plurality of FC ports 328 and the Fibre Channel fabric 332.

The server 334 may comprise a plurality of blade servers, a plurality of network switches, a plurality of storage switches, a plurality of cluster blades, and a management blade, for example. The server 334 may comprise one or more FCoE host bus adapters (HBAs) that may be enabled to implement one or more FCoE host and/or array nodes (E nodes). The one or more E nodes may be operable to implement one or more FCoE virtual networking ports (VN_ports). The one or more VN_ports may be utilized to interconnect with the network switch 314. The one or more VN_ports may be operable to utilize one of fabric provided MAC addresses (FPMA) or SPMA. The FPMAs are MAC addresses assigned by the network switch during a login phase of the Fibre Channel initialization protocol (FIP), as further illustrated in FIG. 4.

In operation, the CPU 304 may be operable to facilitate a proxy login into the FC switch 336 based on the FIP for the server 334. The server 334 may then be operable to directly communicate and/or receive packets to/from the FC switch 336 via the network switch 314.

In accordance with an embodiment of the invention, the FC processor 326 may be operable to receive one or more FCoE packets from the server 334 via one or more Ethernet ports 316. The FC processor 326 may be operable to decapsulate the received FCoE packets into FC packets and place the FC packets into memory 322. The FC processor 326 may be operable to communicate the FC packets to the FC switch 336 via one or more FC ports 328.

In accordance with an embodiment of the invention, the FC processor 326 may be operable to receive one or more FC packets from the FC switch 336 via one or more FC ports 328. The FC processor 326 may be operable to encapsulate the received FC packets into FCoE packets and place the FCoE packets in memory 322. The FC processor 326 may be operable to communicate the FCoE packets to the server 334 via one or more Ethernet ports 316.

The FC processor 326 may be operable to determine a destination address of the server 334 based on the concatenation of a Fibre Channel mapped address (FC_MAP) with a destination ID (D_ID) of the FC packet, if the server 334 utilizes FPMA. The FC processor 326 may be operable to determine a destination address of the server 334 based on the SPMA table 324, if the server 334 utilizes SPMA.

Figure 4:
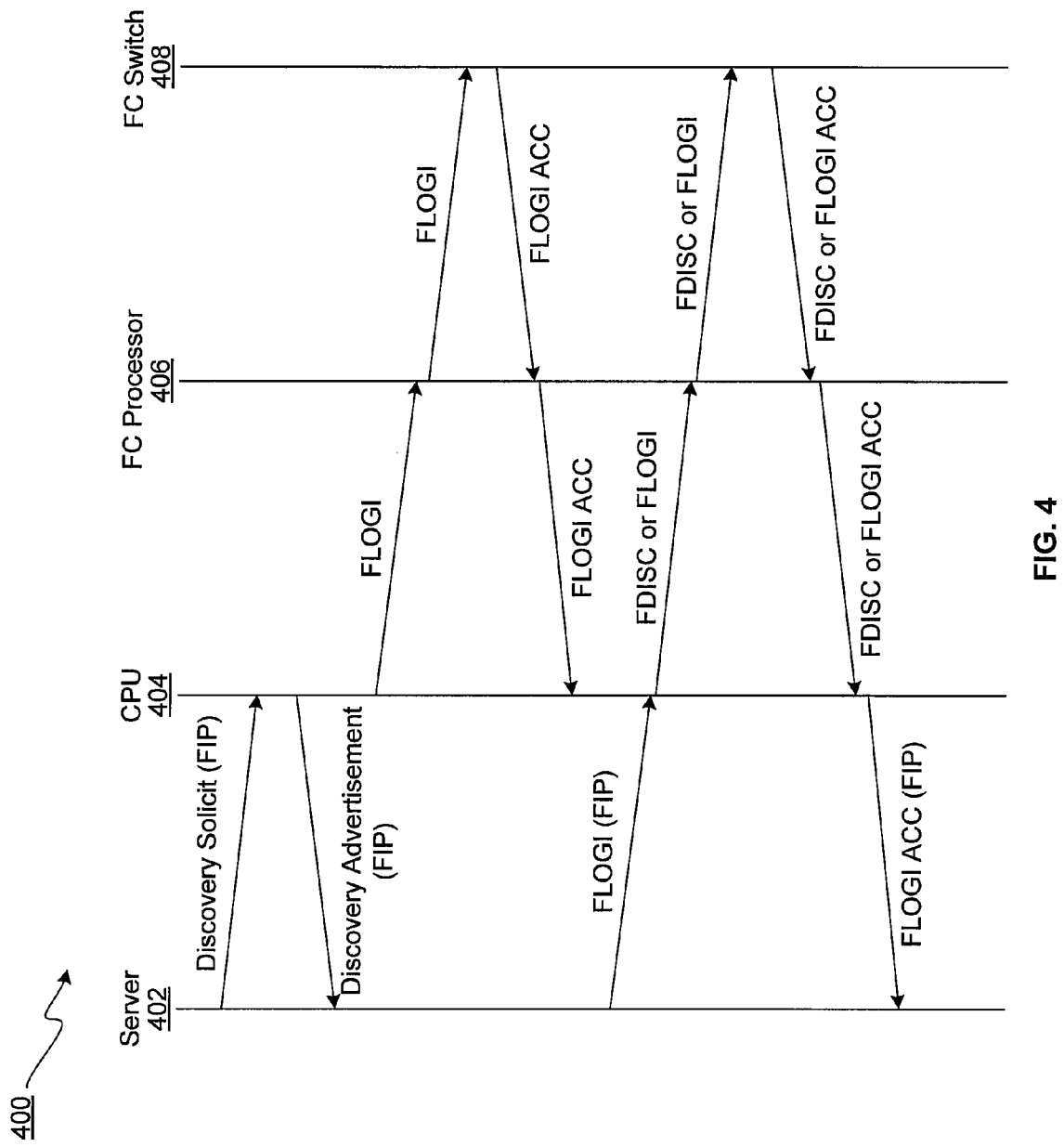
FIG. 4 is a flow diagram illustrating exemplary steps for Fibre Channel fabric login between one or more FCoE devices and a Fibre Channel fabric via the exemplary system illustrated in FIG. 3, in accordance with an embodiment of the invention.

FIG. 4 is a flow diagram illustrating exemplary steps for Fibre Channel fabric login between one or more FCoE devices and a Fibre Channel fabric via the exemplary system illustrated in FIG. 3 in accordance with an embodiment of the invention. Referring to FIG. 4, there is shown a flow diagram 400. The flow diagram 400 may comprise a server 402, a CPU 404, a FC processor 406 and a FC switch 408. The plurality of elements in the flow diagram 400 may be substantially similar to the corresponding elements in FIG. 3.

FIP is a control protocol that may be used to enable FCoE capable E nodes to discover FC fabric switches (FCFs), to enable FC fabric login and to maintain connection to the FC fabric. In accordance with an embodiment of the invention, the network switch 314 may not comprise a FCF and the CPU 404 may be operable to act as a FIP proxy for the FC switch 408. The server 402 may be operable to initialize discovery of one or more FC switches, for example, FC switch 408 by communicating multicast solicitation messages based on the FIP. For example, the server 402 may be operable to communicate multicast discovery solicitation messages to the network switch 314. The network switch 314 may be operable to communicate the received multicast discovery solicitation messages to the CPU 404 based on the Ethertype of the received packets. The CPU 404 may be operable to receive the multicast discovery solicitation messages from the server 402 and respond to the request for discovery of one or more Fibre Channel switches by communicating unicast advertisement messages based on the FIP. For example, the CPU 404 may be operable to communicate a unicast discovery advertisement message to the server 402.

The CPU 404 may be operable to facilitate a login into the FC switch 408 based on the FIP. For example, the CPU 404 may be operable to communicate a request for login into the FC switch 408 to the FC processor 406 via a Fabric Login (FLOGI) message. The FC processor 406 may be operable to communicate the received FLOGI message to the FC switch 408. The FC switch 408 may be operable to respond to the received FLOGI message by communicating a Fabric Login acceptance (FLOGI ACC) message to the FC processor 406. The FC processor 406 may be operable to communicate the received FLOGI ACC message to the CPU 404.

The CPU 404 may be operable to facilitate a proxy login into the FC switch 408 for the server 402 based on the FIP. For example, the server 402 may be operable to communicate a request for login into the FC switch 408 via a FLOGI message to the network switch 314. The network switch 314 may be operable to communicate the received FLOGI message to the CPU 404 based on the Ethertype of the received packet. The CPU 404 may be operable to communicate a FLOGI message or one or more Fabric Discovery (FDISC) messages to the FC processor 406.

In accordance with an embodiment of the invention, the server 402 may be operable to implement a plurality of virtual network ports, for example, VN_ports. The CPU 404 may be operable to communicate a FDISC message for each VN_port in the server 402 to the FC processor 406. The FC processor 406 may be operable to communicate the received FLOGI message or one or more FDISC messages to the FC switch 408. The FC switch 408 may be operable to respond to the received FLOGI message or one or more received FDISC messages by communicating a FLOGI ACC message or one or more Fabric Discovery acceptance (FDISC ACC) messages to the FC processor 406. The FC processor 406 may be operable to communicate the received FLOGI ACC message or one or more FDISC ACC messages to the CPU 304. The CPU 404 may be operable to communicate the received FLOGI ACC message or one or more FDISC ACC messages to the server 402. The server 402 may be operable to directly communicate and/or receive packets to/from the FC switch 408 via the FC processor 406.

Figure 5:
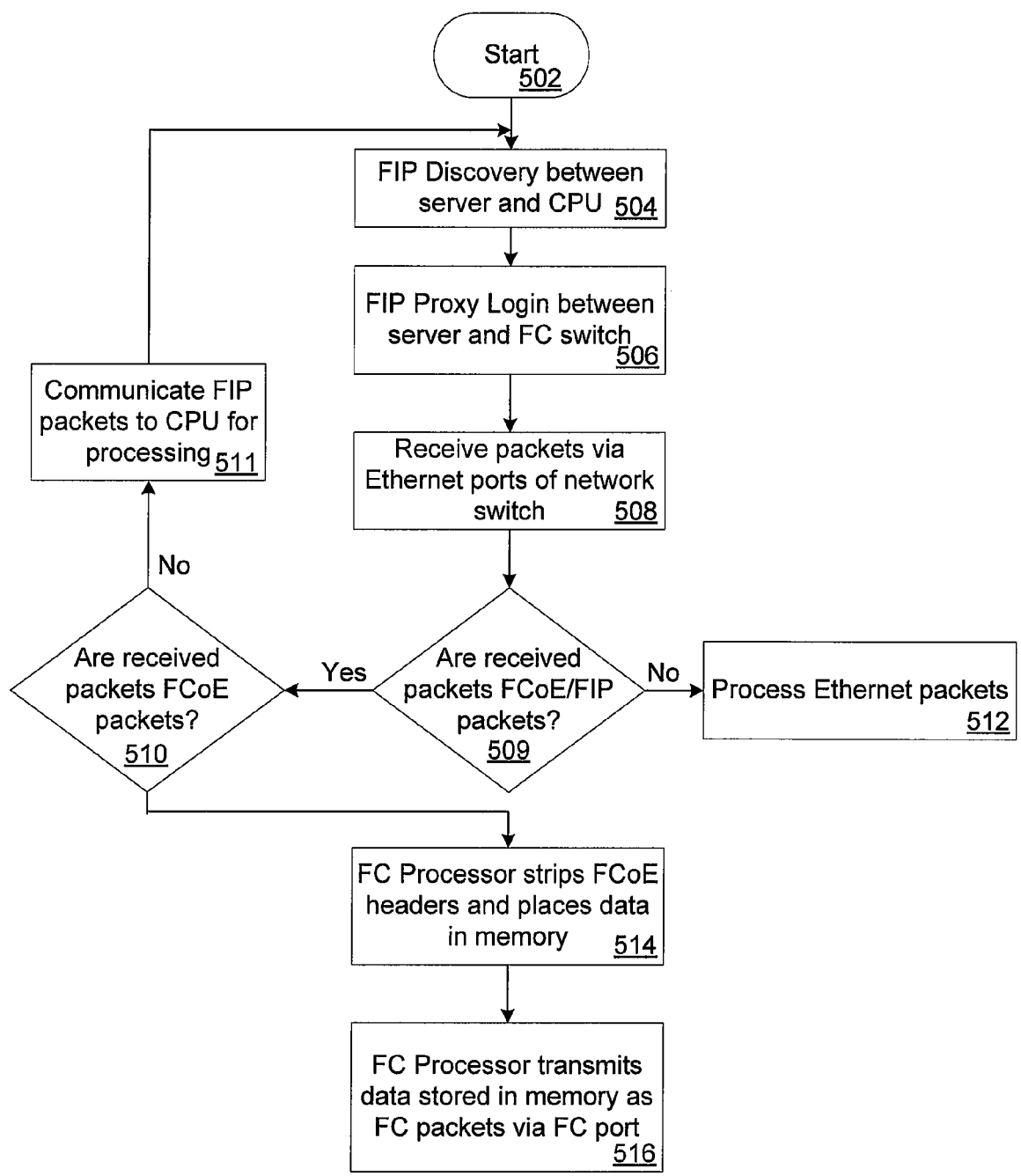
FIG. 5 is a flow chart illustrating exemplary steps for receiving FCoE packets and transmitting Fibre Channel packets based on Fibre Channel and Ethernet interworking, in accordance with an embodiment of the invention.

FIG. 5 is a flow chart illustrating exemplary steps for receiving FCoE packets and transmitting Fibre Channel packets based on Fibre Channel and Ethernet interworking, in accordance with an embodiment of the invention. Referring to FIG. 5, the exemplary steps may begin at step 502. In step 504, the CPU 304 may receive a request for discovery of one or more FC switches 336 based on the Fibre Channel initialization protocol (FIP) from the server 334. In step 506, the CPU 304 may be operable to facilitate a proxy login into the FC switch 336 for the server based on the FIP. In step 508, the FC processor 326 in the network switch 314 may be operable to receive one or more packets from one or more servers 334 via one or more Ethernet ports 316. In step 509, it may be determined whether the received packets are FCoE packets or FIP packets based on, for example, the Ethertype. If the received packets are not FCoE packets or FIP packets, control passes to step 512. In step 512, the network switch 314 may be operable to process the received packets based on the MAC addresses. If the received packets are FCoE packets or FIP packets, control passes to step 510.

In step 510, it may be determined whether the received packets are FCoE packets. In instances where the received packets are not FCoE packets, control passes to step 511. In step 511, the received FIP packets may be communicated to the CPU 304 for processing. For example, the received FIP packets may be utilized for keep link alive (KLA) and/or logout operations. Control then returns to step 504.

In instances where the received packets are FCoE packets, control passes to step 514. In step 514, the FC processor 326 may be operable to decapsulate the received FCoE packets into Fibre Channel (FC) packets and place the FC packets in memory 322. In step 516, the FC processor 326 may be operable to communicate the FC packets to one or more Fibre Channel switches 336 via one or more FC ports 328.

Figure 6:
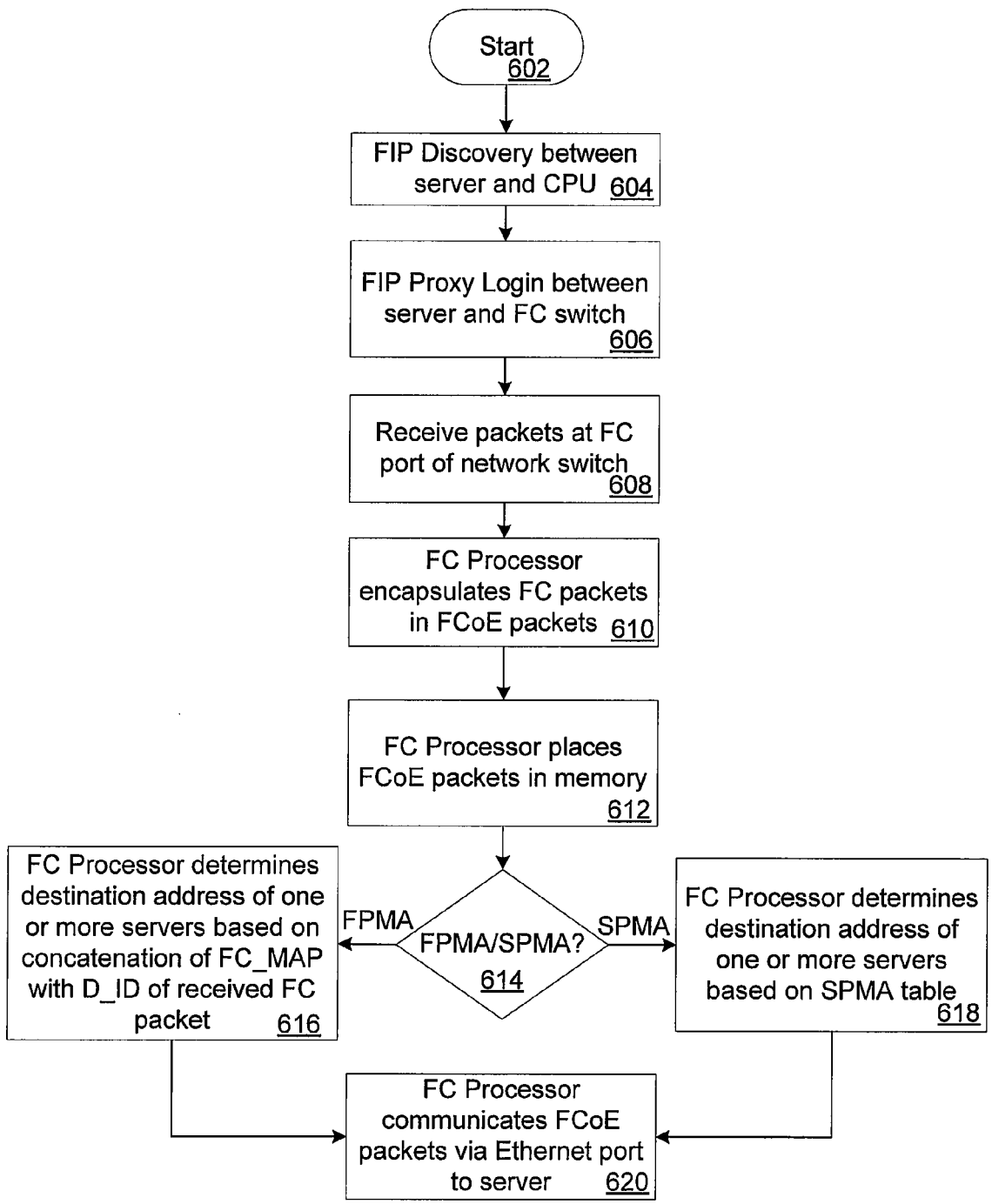
FIG. 6 is a flow chart illustrating exemplary steps for receiving Fibre Channel packets and transmitting FCoE packets based on Fibre Channel and Ethernet interworking, in accordance with an embodiment of the invention.

FIG. 6 is a flow chart illustrating exemplary steps for receiving Fibre Channel packets and transmitting FCoE packets based on Fibre Channel and Ethernet interworking, in accordance with an embodiment of the invention. Referring to FIG. 6, the exemplary steps may begin at step 602. In step 604, the CPU 304 may receive a request for discovery of one or more FC switches 336 based on the Fibre Channel initialization protocol (FIP) from the server 334. In step 606, the CPU 304 may be operable to facilitate a proxy login into the FC switch 336 for the server 334 based on the FIP. In step 608, the FC processor 326 in the network switch 314 may be operable to receive one or more FC packets from one or more FC switches 336 via one or more FC ports 328.

In step 610, the FC processor 326 may be operable to encapsulate the received FC packets into FCoE packets. In step 612, the FC processor 326 may place the FCoE packets in memory 322. In step 614, it may be determined whether the server 334 uses FPMA or SPMA. If the server 334 uses FPMA, control passes to step 616. In step 616, the FC processor 326 may be operable to determine a destination address of one or more servers 334 based on the concatenation of a Fibre Channel mapped address (FC_MAP) with a destination ID (D_ID) of the FC packet, if the one or more servers 334 utilizes FPMA. If the server 334 uses SPMA, control passes to step 618. In step 618, the FC processor 326 may be operable to determine a destination address of one or more servers 334 based on utilizing a destination ID (D_ID) of the FC packet as an index to the MAC address table 324, if the one or more servers 334 utilizes SPMA. In step 620, the network switch 314 may be operable to communicate the FCoE packets to one or more servers 334 via one or more Ethernet ports 316.

In accordance with an embodiment of the invention, a method and system for Fibre Channel and Ethernet interworking may comprise one or more processors in a central processing unit (CPU), for example, CPU 304 (FIG. 3) that is operable to receive via one or more processors, for example, the processor 320 (FIG. 3) in a network switch 314 (FIG. 3) one or more requests for discovery of one or more Fibre Channel (FC) switches, for example, the FC switch 336 (FIG. 3) for one or more servers, for example, server 334 (FIG. 3), wherein the one or more received requests utilizes a Fibre Channel initialization protocol (FIP). The one or more processors in the CPU 304 may be operable to respond to the one or more received requests, via the network switch 314, for discovery of the one or more Fibre Channel switches, for example, the FC switch 336 based on the FIP. The one or more processors in the CPU 304 may be operable to facilitate via the network switch 314, a login into the one or more Fibre Channel switches, for example, the FC switch 336 based on the FIP. The one or more processors in the CPU 304 may be operable to facilitate, via one or more processors, for example, the FC processor 326 in the network switch 314, a proxy login into the one or more FC switches, for example, the FC switch 336 for the one or more servers, for example, server 334 based on the FIP. The one or more servers, for example, the server 334 may then be operable to directly communicate and/or receive packets to/from the one or more FC switches, for example, the FC switch 336 via the network switch 314.

The one or more processors, for example, the FC processor 326 in the network switch 314 may be operable to receive one or more Fibre Channel over Ethernet (FCoE) packets from the one or more servers, for example, the server 334 via one or more Ethernet ports 316. The one or more processors, for example, the FC processor 326 in the network switch 314 may be operable to decapsulate the received FCoE packets into Fibre Channel packets. The one or more processors, for example, FC processor 326 in the network switch 314 may be operable to communicate the Fibre Channel packets to one or more Fibre Channel switches, for example, the FC switch 336 via one or more FC ports 328 (FIG. 3).

The one or more processors, for example, the FC processor 326 in the network switch 314 may be operable to receive one or more Fibre Channel packets from the one or more Fibre Channel switches, for example, the FC switch 336 via one or more FC ports 328. The one or more processors, for example, the FC processor 326 in the network switch 314 may be operable to encapsulate the received Fibre Channel packets into FCoE packets. The one or more processors, for example, the FC processor 326 in the network switch 314 may be operable to communicate the FCoE packets to one or more servers, for example, the server 334 via one or more Ethernet ports 316 (FIG. 3).

The one or more processors, for example, the FC processor 326 in the network switch 314 may be operable to determine a destination address of one or more servers, for example, the server 334 based on the concatenation of a Fibre Channel mapped address (FC_MAP) with a destination ID (D_ID) of the FC packet, if the one or more servers, for example, the server 334 utilizes fabric provided MAC addresses (FPMA). The one or more processors, for example, the FC processor 326 in the network switch 314 may be operable to determine a destination address of one or more servers, for example, the server 334 based on a MAC address table, for example, SPMA table 324 (FIG. 3), if the one or more servers, for example, the server 334 utilizes server provided MAC addresses (SPMA).

Another embodiment of the invention may provide a machine and/or computer readable storage and/or medium, having stored thereon, a machine code and/or a computer program having at least one code section executable by a machine and/or a computer, thereby causing the machine and/or computer to perform the steps as described herein for Fibre Channel and Ethernet interworking.

In accordance with an embodiment of the invention, a method and system for Fibre Channel and Ethernet interworking may comprise one or more first processors, for example, the FC processor 326 in a network switch 314, wherein the one or more first processors, for example, the FC processor 326 is controlled by a second processor, for example, the CPU 304, wherein the second processor, for example, the CPU 304 is operable to control the one or more first processors, for example, the processor 320 to receive one or more requests for discovery of one or more Fibre Channel (FC) switches, for example, the FC switch 336 for one or more servers, for example, the server 334. The second processor, for example, the CPU 304 may be operable to control the one or more first processors, for example, the processor 320 to facilitate a proxy login into the one or more Fibre Channel switches, for example, the FC switch 336 for the one or more servers, for example, the server 334 based on the FIP. The second processor, for example, the CPU 304 may be operable to respond to the one or more received requests for the discovery of the one or more Fibre Channel switches, for example, the FC switch 336 based on the FIP.

The one or more first processors, for example, the FC processor 326 in the network switch 314 may be operable to receive one or more Fibre Channel over Ethernet (FCoE) packets from the one or more servers, for example, the server 334. The one or more first processors, for example, the FC processor 326 in the network switch 314 may be operable to decapsulate the received FCoE packets into Fibre Channel packets. The one or more first processors, for example, the FC processor 326 in the network switch 314 may be operable to communicate the Fibre Channel packets to the one or more Fibre Channel switches. The one or more first processors, for example, the FC processor 326 in the network switch 314 may be operable to receive one or more Fibre Channel packets from the one or more Fibre Channel switches, for example, the FC switch 336. The one or more first processors, for example, the FC processor 326 in the network switch 314 may be operable to encapsulate the received Fibre Channel packets into FCoE packets. The one or more first processors, for example, the FC processor 326 in the network switch 314 may be operable to communicate the FCoE packets to the one or more servers, for example, the server 334. The one or more first processors, for example, the FC processor 326 in the network switch 314 may be operable to determine an address of the one or more servers, for example, the server 334 based on the concatenation of a Fibre Channel mapped address (FC_MAP) with a destination ID (D_ID) of the FC packet, if the one or more servers, for example, the server 334 utilize fabric provided MAC addresses (FPMA). The one or more first processors, for example, the FC processor 326 in the network switch 314 may be operable to determine an address of the one or more servers, for example, the server 334 based on a MAC address table, for example, the SPMA table 324, if the one or more servers, for example, the server 334 utilize server provided MAC addresses (SPMA).

Accordingly, the present invention may be realized in hardware, or a combination of hardware and software. The present invention may be realized in a centralized fashion in at least one computer system, or in a distributed fashion where different elements may be spread across several interconnected computer systems. Any kind of computer system or other apparatus adapted for carrying out the methods described herein may be suited. A combination of hardware and software may be a general-purpose computer system with a computer program that, when being loaded and executed, may control the computer system such that it carries out the methods described herein. The present invention may be realized in hardware that comprises a portion of an integrated circuit that also performs other functions.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for communication, the method comprising:
   receiving, by a central processing unit (CPU) in a host, a discovery request for a Fibre Channel (FC) switch from a server, wherein the discovery request is based on a Fibre Channel initialization protocol (FIP); and
   facilitating, via an FC processor in a network switch coupled to said host, a proxy login into said FC switch for said server based on said FIP, wherein said FC processor in said network switch is controlled by said CPU in said host.

2. The method according to claim 1, wherein said CPU responds to said received discovery request of said FC switch based on said FIP.

3. The method according to claim 1, comprising receiving by said FC processor, one or more Fibre Channel over Ethernet (FCoE) packets from said server.

4. The method according to claim 3, comprising decapsulating by said FC processor, said received one or more FCoE packets into Fibre Channel packets.

5. The method according to claim 4, comprising communicating by said FC processor, said Fibre Channel packets to said FC switch.

6. The method according to claim 1, comprising receiving by said FC processor, one or more Fibre Channel packets from said FC switch.

7. The method according to claim 6, comprising encapsulating by said FC processor, said received one or more Fibre Channel packets into Fibre Channel over Ethernet (FCoE) packets.

8. The method according to claim 7, comprising communicating by said FC processor, said FCoE packets to said server.

9. The method according to claim 8, comprising determining by said one FC processor, an address of said server based on a concatenation of a Fibre Channel mapped address with a destination ID of said received one or more Fibre Channel packets, if said server utilizes fabric provided MAC addresses (FPMA).

10. The method according to claim 8, comprising determining by said FC processor, an address of said server based on a MAC address table, if said server utilizes server provided MAC addresses (SPMA).

11. A system for communication, the system comprising:
    a central processing unit (CPU) in a host configured to control a Fibre Channel (FC) processor in a network switch coupled to said host, wherein said CPU is operable to control said FC processor to:
    receive a discovery request for a FC switch from a server, wherein said discovery request is based on a Fibre Channel initialization protocol (FIP); and
    facilitate a proxy login into said FC switch for said server based on said FIP.

12. The system according to claim 11, wherein said CPU is operable to respond to said discovery request of said FC switch based on said FIP.

13. The system according to claim 11, wherein said FC processor in said network switch is operable to receive one or more Fibre Channel over Ethernet (FCoE) packets from said server.

14. The system according to claim 13, wherein said FC processor in said network switch are operable to decapsulate said received one or more FCoE packets into Fibre Channel packets.

15. The system according to claim 14, wherein said FC processor in said network switch is operable to communicate said Fibre Channel packets to said FC switch.

16. The system according to claim 11, wherein said FC processor in said network switch is operable to receive one or more Fibre Channel packets from said FC switch.

17. The system according to claim 16, wherein said FC processor in said network switch is operable to encapsulate said received one or more Fibre Channel packets into Fibre Channel over Ethernet (FCoE) packets.

18. The system according to claim 17, wherein said FC processor in said network switch is operable to communicate said FCoE packets to said server.

19. The system according to claim 18, wherein said FC processor in said network switch is operable to determine an address of said server based on a concatenation of a Fibre Channel mapped address with a destination ID of said received one or more Fibre Channel packets, if said server utilizes fabric provided MAC addresses (FPMA).

20. The system according to claim 19, wherein said FC processor in said network switch is operable to determine an address of said server based on a MAC address table, if said server utilizes server provided MAC addresses (SPMA).

21. A method for communication, the method comprising:
- receiving, by a central processing unit (CPU) in a host, a discovery request for a Fibre Channel (FC) switch originating from a server, wherein the discovery request is based on a Fibre Channel initialization protocol (FIP); and
- responsive to receiving said discovery request from said server, transmitting, by said CPU via an FC processor in a network switch coupled to said host, a Fabric Login (FLOGI) message to said FC switch for said server, wherein said FC processor is configured to receive Fibre Channel over Ethernet (FCoE) packets from said server via an Ethernet port.

* * * * *